July 7, 1953  A. H. WEIERTZ ET AL  2,644,699
COMBINED PNEUMATIC AND HYDRAULIC RESILIENT SUSPENSION
AND SHOCK ABSORBING DEVICE FOR VEHICLES
Filed March 7, 1951  2 Sheets-Sheet 1
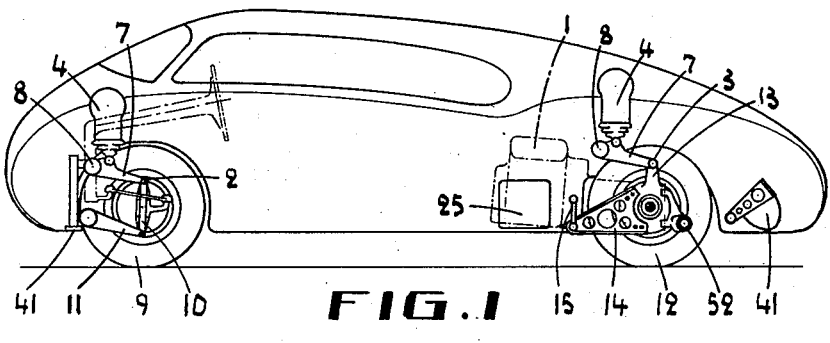
FIG.1
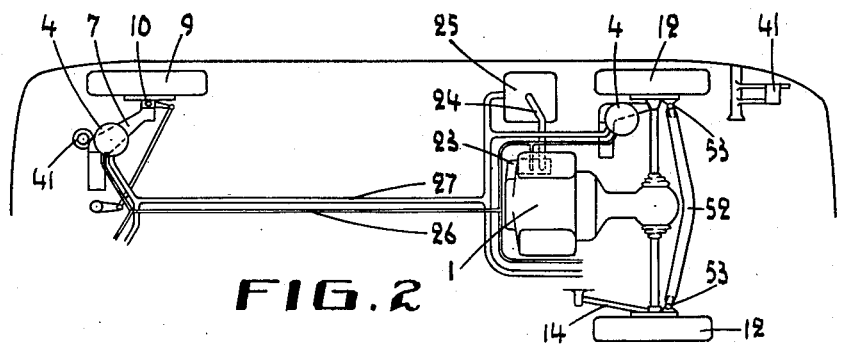
FIG.2
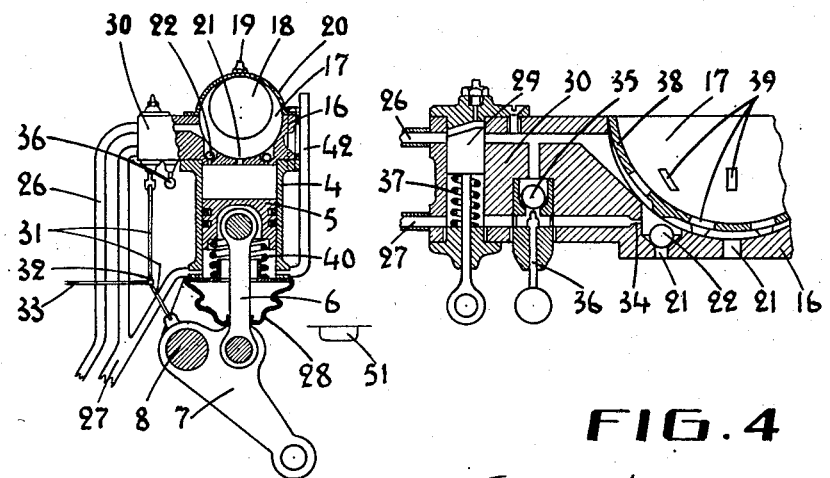
FIG.3
FIG.4
Inventors:
A. H. Weiertz
S. H. A. Weiertz
By Wenderoth, Lind & Ponack
Attorneys

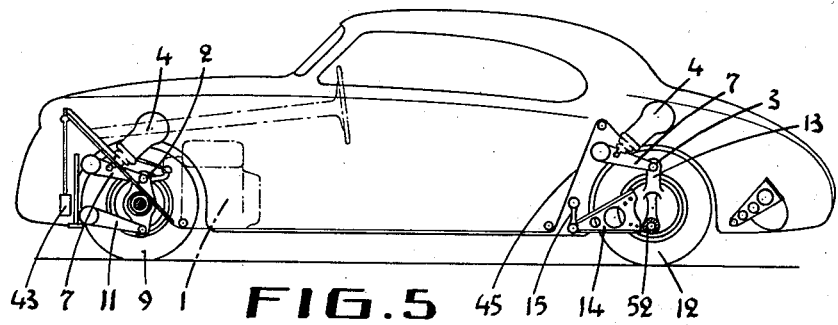
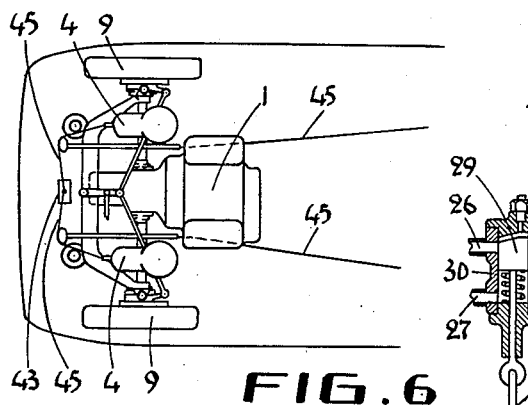
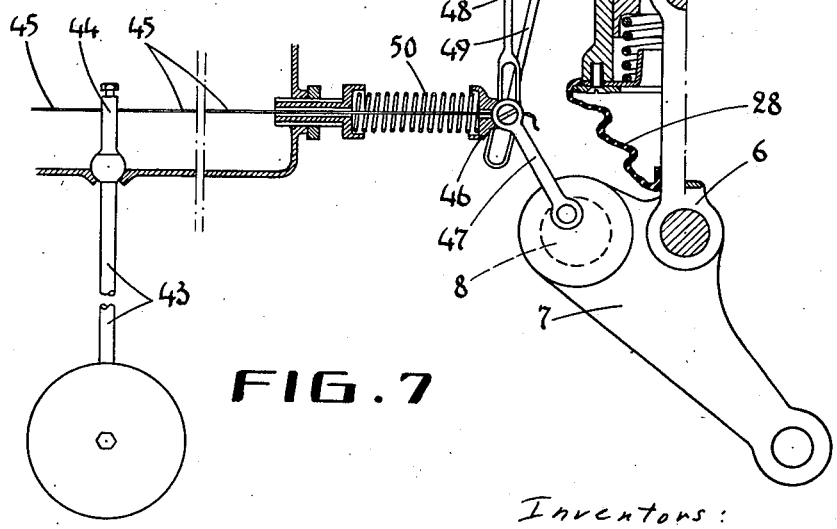

Patented July 7, 1953

2,644,699

UNITED STATES PATENT OFFICE 2,644,699

COMBINED PNEUMATIC AND HYDRAULIC RESILIENT SUSPENSION AND SHOCK ABSORBING DEVICE FOR VEHICLES

Axel Hugo Weiertz, Malmo, and Stig Herbert Albert Weiertz, Svedala, Sweden

Application March 7, 1951, Serial No. 214,312
In Sweden March 8, 1950

13 Claims. (Cl. 280—124)

1

This invention relates to a combined pneumatic and hydraulic resilient suspension and shock absorbing device for vehicles, particularly motor vehicles and especially automobiles and cross-country vehicles.

An object of the invention is to provide a resilient suspension and shock absorbing device of the above type, the function of which is to automatically adjust itself in an advantageous manner to the nature of the road surface as well as to the load of the vehicle.

Another object of the invention is to provide a device of the above type and of such a character that the height of the vehicle above the road surface will normally be independent of the vehicle load and instead adjust itself to the nature of the road surface.

Still another object is to provide a device of the above type which will automatically adapt its function to the travel of the vehicle through curves, thus counteracting lurching of the vehicle.

A still further object is to provide such a device which will fully eliminate the need of metal body suspension springs.

Further objects and features of the invention will become apparent in the course of the following description, reference being had to the accompanying drawings which illustrate two preferred embodiments of the invention. In the drawings:

Fig. 1 is a side view, partly in section, of a sedan type car incorporating one embodiment of the combined pneumatic and hydraulic resilient suspension and shock absorbing device according to the invention;

Fig. 2 is a plan view of the same embodiment;

In this embodiment the resilient suspension and shock absorbing device comprises four units each associated with one of the four road wheels of the car.

Fig. 3 is an axial section on a larger scale through such a unit;

Fig. 4 is a section on a still larger scale through certain details of the same unit;

Fig. 5 in the same manner as Fig. 1 shows a car incorporating a somewhat modified embodiment of the combined pneumatic and hydraulic resilient suspension and shock absorbing device according to the invention;

Fig. 6 is a plan view corresponding to Fig. 5 of the front end portion of the car;

Fig. 7 is a section on a larger scale through one of the units of the device, which are associated each with one of the road wheels of the vehicle.

2

Referring to Figs. 1 and 2, the car shown therein is built for front steering and rear drive and has its motor 1 disposed behind the rear seat and in front of the rear wheels of the car. The chassis and the body are made in a so-called shell structure having a great torsion rigidity about its longitudinal axis. The center of gravity is located farther to the rear than would be the case if the motor were disposed in the front end portion of the car. The motor and power transmission are available through big side openings and through the luggage compartment situated behind said openings.

The combined pneumatic and hydraulic resilient suspension and shock absorbing device comprises four units associated each with one of the four road wheels of the car and operating between the chassis and the respective wheels, the chassis being suspended by said units from joints 2, 3 supported by the road wheels. At least when the car is driven at normal speed, the center of gravity of the chassis is located substantially lower than the suspension joints 3. Each unit comprises a hydraulic cylinder 4 secured to the chassis and a piston 5 movable therein and connected by means of a piston rod 6 with an arm 7. Said arm is mounted for vertical swinging movement in relation to the chassis by having its front end pivoted thereto by means of a pivot 8. The rear ends of the arms are attached to the respective suspension joints 2 and 3. Each of these joints may be a ball and socket joint or comprise a pivot mounted in a rubber bearing, so that the required movability is obtained in the suspension joint. At each of the steering wheels 9 the joint 2 is arranged at the top end of the wheel steering knuckle 10, about which the wheel is swingable for steering purposes by means of the steering gear. For its parallel motion in relation to the chassis the steering knuckle 10 is connected at its lower end with the rear end of an arm 11 which, like arm 7, has its front end pivoted to the chassis. At each rear wheel 12 the joint 3 is disposed on a support 13 arranged on the wheel axle bearing, preferably on the brake shield of the wheel. For parallel motion of the two rear wheels their axle bearings are connected on the one hand with the chassis by means of forwardly directed arms 14 and links 15 and on the other hand with one another by means of a tie rod 52 movably secured to the wheel axle bearings by means of yokes and vertical pivots 53.

At its upper end the cylinder 4 is provided with a cover or head 16 (Figs. 3 and 4) in which there is provided a preferably spherical chamber 17 containing a bladder 18 of oil-resistant rubber or another suitable resilient material, which is filled with gas e. g. air. The bladder 18 is fixed in a removable upper portion 20 of the wall of chamber 17, preferably by an air supply valve 19 which is available from outside. The chamber 17 and the space above the piston 5 in the cylinder 4 are in communication through a number of ports 21 of a limited size. Some, but not all, of said ports are provided with check valves 22 permitting a flow of fluid to pass from the cylinder 4 into the chamber 17 but not in the reverse direction. The chamber 17 is connected with an oil circulation system comprising a pump 23 (Fig. 2) driven by the motor 1 and having a suction conduit 24 coming from a sump 25 and a pressure conduit 26 from which branches lead to the resilient suspension and shock absorbing units at all four road wheels, said pressure conduit 26 being connected in each of these units with the chamber 17 which, in addition, is connected with a conduit 27 for returning the oil to the sump 25. Likewise connected with the return conduit 27 is the space below the piston 5 in the cylinder 4, said space being sealed downwards by means of a bellows 28 and provided with a venting tube 42 which is open at its top.

The communication of the chamber 17 with the pressure conduit 26 from the pump 23 is controlled by a valve 29 disposed in a valve housing 30 which is integral with the cylinder head 16. Valve 29 is in the form of a piston obliquely cut at its top, said piston being movable in a bore in the valve housing 30 and so controlling diametrically opposed ports to the pressure conduit 26 and the chamber 17, which ports open into the bore, that the valve piston 29 when moving upwardly to close the said ports, begins and concludes the closing of the port to the chamber 17 before it begins and concludes, respectively, the closing of the port to the pressure conduit 26. The valve 29 is operatively connected with the arm 7 so that upon movement of the piston 5 upwardly or downwardly in the cylinder 4 the valve 29 is displaced downwardly or upwardly, i. e. in its opening or closing direction, respectively. The connection between valve 29 and arm 7 may consist, for instance as shown in Fig. 3, of a tie rod 31 with a toggle joint 32, so that the effective length of the tie rod is adjustable by a member 33 engaging at the toggle joint 32 and operable manually or otherwise. As shown in Fig. 4, the chamber 17 is connected with the return conduit 27 by means of a calibrated throttle opening 34 and a check valve 35 which may be forced from its seat in the valve housing 30 by a member 36 operable manually or otherwise. The connection of the check valve 35 and preferably also of the throttle opening 34 to the conduit 27 extends through the space below the valve piston 29 which is suitably urged in its closing direction by a spring 37. In the lower portion of the chamber 17 a cup 38 may be disposed, provided on its underside with distance members and having suitably distributed and shaped through-flow openings 39 for the oil, said openings being offset in relation to the ports 21. Said cup 38 serves the purpose of better distributing the oil pressure from the cylinder 4 on the bladder 18 and of preventing the latter, when expanded, from penetrating or possibly being clamped or damaged in some of the openings in the wall of the chamber 17. A spring 40 is adapted for a soft limitation of the downward movement of the piston 5 in the cylinder 4, and mounted on the chassis is a stop 51 e. g. of rubber, with which the arm 7 cooperates to limit the upward movement of the piston 5 in the cylinder 4. A pressure relief valve (not shown) may be arranged for limiting the oil pressure generated by the pump 23 in the pressure conduit 26 to a certain maximum value.

The function of the device is as follows. As soon as the motor 1 is started, the pump 23 will operate and thus presses oil through the pressure conduit 26 into the chamber 17 and the space above the piston 5 in the cylinder 4 of each of the units associated with the road wheels. The pressure oil urges the piston 5 downwards in the cylinder 4 and may compress the air bladder 18 more or less in dependence on the initial pressure therein and on the vehicle load, until the valve 29 throttles the connection between the chamber 17 and the pressure conduit 26 sufficiently in order that the flow of oil into the chamber 17 and the discharge of oil from said chamber through the throttle opening 34 (and the possible leakage past the piston 5 in the cylinder 4) may keep in step with one another. At this, the chassis will have been raised in relation to the road wheels up to a level above ground which is independent of the vehicle load. The pressure building up in the chamber 17 and the air-filled bladder 18 will vary with the vehicle load and the nature of the road surface, and as a desirable result thereof the resiliency which is dependent on the amount of air enclosed within the compressible bladder 18, will become the softer, the less loaded the vehicle is and the more rugged the road surface is, as will be explained in detail in the following. On propulsion of the car the device acts not only as a vehicle spring whose stiffness increases with the vehicle load, but simultaneously as a hydraulic shock absorber because of the connection ports 21 between the chamber 17 and the space above the piston 5 in the cylinder 4 being relatively narrow and some of them being provided with check valves 22. The shock absorption is improved by the valve 29 temporarily increasing the supply of oil under pressure to the chamber 17 at each occurring shock and the more so, the more vigorous the shock is. This temporary increase in the supply of pressure oil occurs suddenly at the shock as a result of the piston 29, by its downwardly directed opening movement, accelerating the oil supply to the space above the piston 29 and immediately afterwards causing said space to communicate with the opening in the valve housing 30, leading therefrom to the chamber 17. Since the oil supply to the chamber 17 is thus temporarily increased at each shock and the more so, the more vigorous this shock is, the oil amount in the chamber 17 and the space above the piston 5 in the cylinder 4 and consequently also the height of the vehicle above ground becomes greater, the more rugged the road surface is. At the same time the resiliency becomes softer as a result of the ratio, varying with the height of the vehicle above ground, between the moment arms of the forces acting upon the arm 7, and the resulting smaller pressure on the piston 5 and the bladder 18. Furthermore, the device can be manually or otherwise adjusted to that level above ground, on which it will hold the chassis, by the adjusting member 33, i. e. by changing the relative positions of the control valve 29 and the piston 5 in the cylinder 4. With the use of the adjusting means 33 the device may also be utilized as a hydraulic jack for elevating the chassis, e. g. for permitting changing of tires. After elevation of the chassis by supply of pressure oil to the chamber 17, the chassis may be supported in the elevated position by means of an unfoldable support 41 (Fig. 1), whereupon oil can be discharged from the chamber 17 e. g. by opening of the valve 35, the wheel being automatically raised by the spring 40 (Fig. 3) which has been compressed at the supply of oil and the elevation of the chassis.

Referring now to Figs. 5 to 7, the embodiment shown therein differs from the first embodiment substantially in the following respects. The car has its motor 1 located in the front end portion of the chassis and is assumed built for front drive and front steering. The hydraulic cylinders 4 containing the pistons 5 engaging the arms 7 with their piston rods 6, are mounted in a rearwardly inclined position on the chassis. Mounted at the front end portion of the chassis is a pendulum 43 having an extension 44 projecting beyond its point of suspension. Secured to this extension 44 are flexible pulling means 45 which connect the resilient suspension and shock absorbing units disposed on either side of the vehicle and which are fixed in movable members 46 at said units. Each member 46 is linked (47) to the arm 7 and connected with the valve 29 and the lifting member 36 of the valve 35 by means of tie rods 48 and 49 which are adjustable in effective length (cf. Fig. 7). The pulling means 45 are held stretched by springs 50 which act upon the members 46. On driving through a curve the pendulum 43 makes a deflection under the influence of gravity and acts through the pulling means 45 and the tie rods 48, 49 on the control of the valves 29, 35 in relatively opposed directions at the units on the two opposed sides of the vehicle, so that the tendency of the latter of lurching under the influence of gravity is counteracted by the fact that a suitable difference arises between the oil pressures and oil amounts, resulting from the control of the valves 29 and 35, in the units on the two opposed sides of the vehicle.

The compressible air container or bladder 18 in the chamber 17 has a two fold task, viz. to prevent air from being mixed with the oil and to render possible the imprisonment and maintaining of a larger air volume at a correspondingly greater pressure within the limited space in the chamber 17 also when the oil pressure therein sinks. This is desirable in view of the fact that the resiliency is dependent on the amount of air which is imprisoned in the chamber 17 and which has to be sufficiently large in order that the shock absorber may simultaneously fulfill the task of a vehicle spring.

Many modifications of the described device are conceivable within the spirit of the invention. The invention must not therefore be considered limited to the embodiments which have been described above and shown in the drawings to elucidate the invention.

What we claim and desire to secure by Letters Patent is:

1. In a wheeled motor vehicle having supports for supporting the body of the vehicle from the wheels thereof, a combined pneumatic and hydraulic resilient suspension and shock absorbing device comprising a circulation system for a liquid fluid mounted on the vehicle, a pressure-generating pump driven from the motor of the vehicle and connected in said circulation system for circulating the liquid fluid therein, a shock absorber acting between the vehicle body and any of the supports therefor and comprising a hydraulic cylinder and a piston movable therein, a chamber associated with said hydraulic cylinder and connected in said liquid fluid circulation system, a wall forming part of said chamber and having restricted ports providing communication between said chamber and the space on one side of said piston in said cylinder, and means for imprisoning in said chamber in separated relation to the liquid fluid and nevertheless subjected to the pressure thereof a sufficient amount of a gaseous fluid for causing the shock absorber to fulfill also the task of a vehicle spring.

2. In a wheeled motor vehicle a combined pneumatic and hydraulic resilient suspension and shock absorbing device as claimed in claim 1, in which said means comprises a substantially spherical bladder and in which said chamber is spherical in order that it may be completely filled by, and thus practically everywhere support said bladder imprisoning the gaseous fluid in said chamber.

3. In a wheeled motor vehicle having separate supports for supporting the body of the vehicle from the separate wheels, the combination of a circulation system for a liquid fluid and a pressure-generating pump driven from the motor of the vehicle and connected in said circulation system for circulating the liquid fluid therein, with a separate combined pneumatic and hydraulic resilient suspension and shock absorbing device between each of the separate supports for the vehicle body and the latter, said device comprising a lever mounted for vertically swinging movement on the vehicle body and connected to the respective support, a hydraulic cylinder secured to the vehicle body, a cylinder head at one end of said cylinder, a piston movable in said cylinder, a piston rod projecting from said piston through the other end of said cylinder and connected to said lever, said cylinder head forming a chamber connected in said liquid fluid circulation system and communicating through restricted ports in its wall with the adjacent end of said cylinder, and means in said chamber for imprisoning therein an essential amount of a gaseous fluid in separated relation to the liquid fluid and nevertheless subjected to the pressure thereof.

4. The combination claimed in claim 3, and check valves in some of said restricted ports allowing flow of pressure fluid from said cylinder into said chamber but not in the reverse direction.

5. The combination claimed in claim 3, and a control valve connecting said chamber with the pressure side or said pump in said circulation system and operatively connected with said movable piston in said hydraulic cylinder so as to be operated by the movements of said piston in said cylinder.

6. In a wheeled motor vehicle having separate supports for supporting the body of the vehicle from the separate wheels thereof, the combination comprising a pressure-generating pump for a liquid fluid driven from the motor of the vehicle, a combined pneumatic and hydraulic resilient suspension and shock absorbing device acting between the vehicle body and said supports and comprising for each of said supports a lever mounted at one end for vertically swinging movement on the vehicle body and articulated at its other end to the support, and a shock absorber comprising a hydraulic cylinder secured to the vehicle body, a piston movable in said cylinder, means projecting through one end of said cylinder and connecting said piston to said lever at a point between the ends thereof, and a cylinder head on said cylinder at the other end thereof, said cylinder head forming a chamber communicating through restricted ports in its wall with the adjacent end of said cylinder, a conduit for liquid pressure fluid from the pressure side of said pump, a control valve between said chamber and said pressure conduit, a return conduit for the liquid fluid from said chamber to said pump, means for controlling the escape of liquid pressure fluid from said chamber to said return conduit, and means in said chamber for imprisoning therein an essential amount of a gaseous fluid in separated relation to the liquid pressure fluid and nevertheless subjected to the pressure thereof.

7. The combination as claimed in claim 6, in which the control valve between said chamber to said liquid pressure fluid is operatively connected with the movable piston in the hydraulic cylinder of the shock absorber in such a manner that said control valve is moved in its opening direction when said piston is moving towards the cylinder head.

8. A combined pneumatic and hydraulic resilient suspension and shock absorbing device of the character described, comprising a hydraulic shock absorber comprising a hydraulic cylinder, a piston movable in said cylinder, and a cylinder head at one end of said cylinder, said cylinder head forming a chamber communicating through restricted ports in its wall with the adjacent end of said cylinder, said chamber having an inlet for liquid pressure fluid and an outlet for the escape of such fluid, means for controlling said inlet and outlet in dependence on the movements of said piston in said cylinder, means in said chamber for imprisoning therein a substantial amount of gaseous fluid in separated relation to the liquid pressure fluid and nevertheless subjected to the pressure thereof, and means for venting and draining the cylinder at the end thereof removed from said cylinder head.

9. In a wheeled motor vehicle with a combined pneumatic and hydraulic resilient suspension and shock absorbing device as claimed in claim 8 for supporting the body of the vehicle from each of the wheels, the combination with these devices of a pendulum suspended on the vehicle and connected with the means for controlling the liquid pressure fluid inlets and outlets of the chambers for so adjusting said last-mentioned means in dependence on the movements of the pendulum as to cause said devices to counteract lurching of the vehicle when travelling through curves.

10. In a wheeled motor vehicle having separate supports for supporting the body of the vehicle from the separate wheels thereof, the combination comprising a pressure-generating pump for a liquid fluid driven from the motor of the vehicle, a combined pneumatic and hydraulic resilient suspension and shock absorbing device acting between the vehicle body and said supports and comprising for each of said supports a lever mounted at one end for vertically swinging movement on the vehicle body and articulated at its other end to the support, and a shock absorber comprising a hydraulic cylinder secured to the vehicle body, a piston movable in said cylinder, means projecting through one end of said cylinder and connecting said piston to said lever at a point between the ends thereof, and a cylinder head on said cylinder at the other end thereof, said cylinder head forming a chamber communicating through restricted ports in its wall with the adjacent end of said cylinder, a conduit for liquid pressure fluid from the pressure side of said pump, a control valve between said chamber and said pressure conduit, a return conduit for the liquid fluid from said chamber to said pump, a calibrated throttle for controlling the escape of liquid pressure fluid from said chamber to said return conduit, and means in said chamber for imprisoning therein an essential amount of a gaseous fluid in separated relation to the liquid pressure fluid and nevertheless subjected to the pressure thereof.

11. In a wheeled motor vehicle having separate supports for supporting the body of the vehicle from the separate wheels thereof, the combination comprising a pressure-generating pump for a liquid fluid driven from the motor of the vehicle, a combined pneumatic and hydraulic resilient suspension and shock absorbing device acting between the vehicle body and said supports and comprising for each of said supports a lever mounted at one end for vertically swinging movement on the vehicle body and articulated at its other end to the support, and a shock absorber comprising a hydraulic cylinder secured to the vehicle body, a piston movable in said cylinder, means projecting through one end of said cylinder and connecting said piston to said lever at a point between the ends thereof, and a cylinder head on said cylinder at the other end thereof, said cylinder head forming a chamber communicating through restricted ports in its wall with the adjacent end of said cylinder, a conduit for liquid pressure fluid from the pressure side of said jump, a control valve between said chamber and said pressure conduit, a return conduit for the liquid fluid from said chamber to said pump, means for controlling the escape of liquid pressure fluid from said chamber to said return conduit, means in said chamber for imprisoning therein an essential amount of a gaseous fluid in separated relation to the liquid pressure fluid and nevertheless subjected to the pressure thereof, and links connecting said control valve to said lever for moving said control valve in its opening direction on movement of said piston in said cylinder towards the cylinder head, and an adjustable member connected to said links for adjusting the relative positions of said control valve and said piston.

12. In a wheeled motor vehicle having separate supports for supporting the body of the vehicle from the separate wheels thereof, the combination comprising a pressure-generating pump for a liquid fluid driven from the motor of the vehicle, a combined pneumatic and hydraulic resilient suspension and shock absorbing device acting between the vehicle body and said supports and comprising for each of said supports a lever mounted at one end for vertically swinging movement on the vehicle body and articulated at its other end to the support, and a shock absorber comprising a hydraulic cylinder secured to the vehicle body, a piston movable in said cylinder, means projecting through one end of said cylinder and connecting said piston to said lever at a point between the ends thereof, and a cylinder head on said cylinder at the other end thereof, said cylinder head forming a chamber communicating through restricted ports in its wall with the adjacent end of said cylinder, a conduit for liquid pressure fluid from the pressure side of said pump, a control valve between said chamber and said pressure conduit, a return conduit for the liquid fluid from said chamber to said pump, means for controlling the escape of liquid pressure fluid from said chamber to said return conduit, means in said chamber for imprisoning therein an essential amount of a gaseous fluid in separated relation to the liquid pressure fluid and nevertheless subjected to the pressure thereof, said means for controlling the escape of liquid pressure fluid from said chamber comprising a valve and means operating in dependence on the movements of said piston in said cylinder for controlling said valve.

13. A combined pneumatic and hydraulic resilient suspension and shock absorbing device of the character described, comprising a hydraulic shock absorber comprising a hydraulic cylinder, a piston movable in said cylinder, and a cylinder head at one end of said cylinder, said cylinder head forming a spherical chamber communicating through restricted ports in its wall with the adjacent end of said cylinder, said chamber having an inlet for liquid pressure fluid and an outlet for the escape of such fluid, means for controlling said inlet and outlet in dependence on the movements of said piston in said cylinder, a spherical bladder with an inflating valve projecting through the wall of the chamber at the top thereof for imprisoning therein a substantial amount of a gaseous fluid in separated relation to the liquid pressure fluid and nevertheless subjected to the pressure thereof, and means for venting and draining the cylinder at the end thereof remote from said cylinder head, a cup-shaped member in said chamber on the bottom thereof, said member having openings offset in relation to the restricted ports between said chamber and said cylinder, distance members on the underside of said cup-shaped member holding said member at a distance from the bottom of said chamber.

AXEL HUGO WEIERTZ.
STIG HERBERT ALBERT WEIERTZ.

References Cited in the file of this patent

UNITED STATES PATENTS

| Number | Name | Date |
|---|---|---|
| 2,196,089 | Wallace | Apr. 2, 1940 |
| 2,490,311 | Du Rostu | Dec. 6, 1949 |
| 2,521,074 | Marston | Sept. 5, 1950 |